(12) United States Patent
Kuk et al.

(10) Patent No.: US 12,048,912 B2
(45) Date of Patent: Jul. 30, 2024

(54) LITHIUM-ADSORPTIVE MOLDED OBJECT

(71) Applicants: POSCO, Pohang-si (KR); RESEARCH INSTITUTE OF INDUSTRIAL SCIENCE & TECHNOLOGY, Pohang-si (KR)

(72) Inventors: Seung Taek Kuk, Pohang-si (KR); Young-Su Kwon, Pohang-si (KR); Woonkyoung Park, Pohang-si (KR); Kwang Seok Park, Pohang-si (KR); Young-Seon Ko, Seoul (KR); Heok Yang, Pohang-si (KR)

(73) Assignees: POSCO CO., LTD, Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 933 days.

(21) Appl. No.: 17/050,074

(22) PCT Filed: Apr. 23, 2019

(86) PCT No.: PCT/KR2019/004911
§ 371 (c)(1),
(2) Date: Oct. 23, 2020

(87) PCT Pub. No.: WO2019/209011
PCT Pub. Date: Oct. 31, 2019

(65) Prior Publication Data
US 2021/0094014 A1 Apr. 1, 2021

(30) Foreign Application Priority Data
Apr. 23, 2018 (KR) .......................... 10-2018-0046971

(51) Int. Cl.
*B01J 20/02* (2006.01)
*B01J 20/28* (2006.01)
*B01J 20/30* (2006.01)
*C08L 27/06* (2006.01)
*C08L 31/04* (2006.01)

(52) U.S. Cl.
CPC ..... *B01J 20/0248* (2013.01); *B01J 20/28059* (2013.01); *B01J 20/28085* (2013.01); *B01J 20/3007* (2013.01); *B01J 20/3021* (2013.01); *B01J 20/3042* (2013.01); *C08L 27/06* (2013.01); *C08L 31/04* (2013.01); *B01J 2220/46* (2013.01)

(58) Field of Classification Search
CPC .. B01J 20/02; B01J 20/0248; B01J 20/28059; B01J 20/20; B01J 20/28085; B01J 20/3007; B01J 20/3021; B01J 20/3042; B01J 2220/46; C08L 27/06; C08L 31/04
USPC ...................................................... 502/401
See application file for complete search history.

(56) References Cited

U.S. PATENT DOCUMENTS 8,741,150 B2 6/2014 Chung et al.
2020/0316557 A1 10/2020 Boualleg et al.

FOREIGN PATENT DOCUMENTS

| AR | 078966 A1 | 12/2011 |
|---|---|---|
| AR | 108577 A1 | 9/2018 |
| CN | 1511964 A | 7/2004 |
| CN | 102631897 A | 8/2012 |
| CN | 103579670 A | 2/2014 |
| CN | 104884648 A | 9/2015 |
| CN | 108854934 A | 11/2018 |
| CN | 108854936 A | 11/2018 |
| JP | 3646156 B2 | 5/2005 |
| JP | 3883491 B2 | 2/2007 |
| JP | 2012-504190 A | 2/2012 |
| JP | 2012-224509 A | 11/2012 |
| KR | 10-2001-0037837 A | 5/2001 |
| KR | 10-1765826 B1 | 7/2013 |
| KR | 10-2014-0037660 A | 3/2014 |
| KR | 10-2015-0049561 A | 5/2015 |
| KR | 10-2016-0088254 A | 7/2016 |

(Continued)

OTHER PUBLICATIONS

Written Opinion and International Search Report dated Jul. 19, 2019 issued in International Patent Application No. PCT/KR2019/004911 (with English translation).

(Continued)

*Primary Examiner* — Edward M Johnson
(74) *Attorney, Agent, or Firm* — Morgan, Lewis & Bockius LLP (57) ABSTRACT

A lithium adsorption molded body includes a lithium adsorbent and a copolymer including a repeating unit represented by

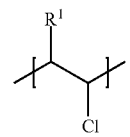

and a repeating unit represented by

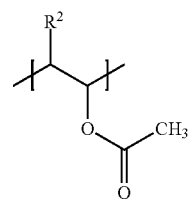

in which $R^1$ and $R^2$ are each independently hydrogen or a C1 to C10 alkyl group.

8 Claims, 6 Drawing Sheets

(56) References Cited

FOREIGN PATENT DOCUMENTS

| | | |
|---|---|---|
| KR | 10-2016-0134085 A | 11/2016 |
| KR | 10-2017-0093085 A | 8/2017 |
| KR | 10-2017-0139688 A | 12/2017 |
| WO | 2013/035222 A1 | 3/2013 |
| WO | WO2011/058841 A1 | 3/2013 |
| WO | 2015/171109 A1 | 11/2015 |

OTHER PUBLICATIONS

A. Danait et al., "Miscibility Behavious of Blends of a Thermoplastic Polyester Polyurethane with Vinyl Polymers," Macromol . . . , No. 148, 1999, pp. 489-497.

X. Hong et al., "Research on advances in lithium extraction from salt lake brine," Science & Technology Information, No. 19, Jul. 3, 2011.

M. Xuelian, "Research on production and properties of vinyl chloride-vinyl acetate copolymer resin," Shihezi Science and Technology, No. 1, Feb. 10, 2010.

LITHIUM-ADSORPTIVE MOLDED OBJECT

CROSS-REFERENCE OF RELATED APPLICATIONS

This application is the U.S. National Phase under 35 U.S.C. § 371 of International Patent Application No. PCT/KR2019/004911, filed on Apr. 23, 2019, which in turn claims the benefit of Korean Application No. 10-2018-0046971, filed on Apr. 23, 2018, the entire disclosures of which applications are incorporated by reference herein.

TECHNICAL FIELD

The present invention relates to a lithium adsorption molded body having an excellent lithium adsorption performance and mechanical strength and a method of manufacturing the same.

BACKGROUND ART

Lithium and lithium compounds are currently used in a wide range of fields such as a secondary battery material, a refrigerant adsorbent, a catalyst, a medicine, and are one of the important resources that have attracted attention as a nuclear fusion energy resource. In addition, lithium and lithium compounds are the resources expected that the demand for those will increase even in the technology fields such as a high-capacity battery, an electric vehicle, and the like which are expected to be put to practical use.

As such, lithium is an important resource that can be used in various fields and its importance increases, but world's lithium reserves on land are only about 2 to 9 million tons. Studies on technology for securing lithium resources by various routes have been conducted in order to cope with the limited reserves. For example, studies for effectively recovering a trace amount of lithium dissolved in an aqueous solution such as seawater, bittern, waste liquid of lithium batteries, and the like are currently conducted.

As a conventional method of recovering lithium, a method of reducing lithium ions by an electrochemical method, a method of reducing lithium oxides with magnesium or aluminum metal, and the like have been known. As another method, a method of recovering lithium using an adsorbent that selectively adsorbs lithium ions or the like has been studied. The main object of these studies using a lithium adsorbent is to develop a high-performance adsorbent having a high selectivity to lithium ions and an excellent adsorption and desorption performance.

As a result of these studies, a method of producing a powder that facilitates adsorption and desorption of lithium by using manganese oxide as a material by a solid-phase reaction or a gel process is known, and the powder produced by such a method has been used as a cathode material for a lithium secondary battery, a material for a lithium adsorbent, and the like. However, since the powdered lithium adsorbent is not easily treated, it is necessary to mold the powdered lithium adsorbent for use.

In general, the manufactured molded body is used in a column shape. In this case, a contact area is important for recovering lithium, and in particular, the molded body placed at a lower portion is required to withstand the weight of the molded body stacked thereon. In a general ceramic manufacturing process, a ceramic powder and a binder, a solvent dissolving the binder, a plasticizer added to facilitate molding, and a dispersant dispersing these materials are mixed, a mixture is molded by a molding process by which a desirable shape may be obtained, and a molded body is sintered by performing a heat treatment to secure a strength, the binder and the additives are removed in the sintering process, and pores are formed at positions at which the binder and the additives are removed so as to secure a surface area. However, among materials for recovering lithium, in a case of powders, which may not be subjected to a heat treatment due to a change in a shape thereof at a high temperature, a process in which a molded body is sintered by a high-temperature heat treatment, organic matters are removed in the sintering process, and a specific surface area is increased by forming pores may not be used.

In addition, since most of lithium is recovered from an aqueous solution including salt water, water-soluble additives may not be used to manufacture a molded body. Therefore, water-insoluble additives need to be used. However, since water-insoluble additives are not dissolved in water, there is a problem in that an organic solvent is required to be used.

Therefore, there is still a demand for a new type of lithium adsorbent capable of selectively adsorbing only lithium ions with an excellent performance without deterioration of an adsorption efficiency as compared the powdered lithium adsorbent and facilitating an desorption process for recovering lithium after adsorption.

Accordingly, there is an urgent need for the development of a method of manufacturing a lithium adsorbent having an excellent lithium adsorption performance and mechanical strength, and capable of improving productivity.

The above information disclosed in this Background section is only for enhancement of understanding of the background of the invention and therefore it may contain information that does not form the prior art that is already known in this country to a person of ordinary skill in the art.

DISCLOSURE

The present invention has been made in an effort to provide a lithium adsorption molded body having an excellent lithium adsorption performance and mechanical strength and a method of manufacturing the same.

In detail, the present invention has been made in an effort to provide a lithium adsorption molded body manufactured by mixing only a lithium adsorbent and a binder and using no plasticizer or dispersant without a high-temperature heat treatment, and a method of manufacturing the same.

An exemplary embodiment of the present invention provides a lithium adsorption molded body including: a lithium adsorbent; and a copolymer including a repeating unit represented by the following Chemical Formula 1 and a repeating unit represented by the following Chemical Formula 2,

[Chemical Formula 1]

[Chemical Formula 2]

(in the Chemical Formulas 1 and 2, $R^1$ and $R^2$ are each independently hydrogen or a C1 to C10 alkyl group).

The lithium adsorbent may include at least one selected from the group consisting of manganese, aluminum, iron, and magnesium. More specifically, the lithium adsorbent may include aluminum.

The copolymer may include 80 to 87 wt % of the repeating unit represented by the Chemical Formula 1 and 13 to 20 wt % of the repeating unit represented by the Chemical Formula 2.

The lithium adsorption molded body may include 80 to 95 wt % of the lithium adsorbent and 5 to 20 wt % of the copolymer.

A specific surface area of the lithium adsorption molded body may be 15 to 40 $m^2/g$.

The lithium adsorption molded body may have 10 to 90 vol % of pores with 0.01 to 0.1 μm of a pore size and 10 to 90 vol % of the pores with 1 to 10 μm of the pore size with respect to the total pores in the lithium adsorption molded body.

A compressive strength of the lithium adsorption molded body may be 5 to 30 MPa.

Another embodiment of the present invention provides a method of manufacturing a lithium adsorption molded body, including: producing a mixture by mixing a lithium adsorbent, a copolymer including a repeating unit represented by the following Chemical Formula 1 and a repeating unit represented by the following Chemical Formula 2, and a solvent; and manufacturing the lithium adsorption molded body by molding the mixture,

[Chemical Formula 1]

[Chemical Formula 2]

(in the Chemical Formulas 1 and 2, $R^1$ and $R^2$ are each independently hydrogen or a C1 to C10 alkyl group).

50 to 75 parts by weight of the lithium adsorbent having a particle size of less than 200 μm and 25 to 50 parts by weight of the lithium adsorbent having a particle size of 200 to 300 μm with respect to 100 parts by weight of the lithium adsorbent may be included in the lithium adsorbent.

The solvent may include at least one selected from the group consisting of an amide-based solvent, an ether-based solvent, a ketone-based solvent, and a sulfoxide-based solvent.

A viscosity of the mixture may be 1000 to 1500 cps at 25° C.

In the manufacturing of the lithium adsorption molded body, the lithium adsorption molded body may be manufactured by an extruder, and an extrusion speed may be 10 to 100 mm/min.

The method may further include, after the manufacturing of the lithium adsorption molded body, drying the lithium adsorption molded body.

The method may further include, after the manufacturing of the lithium adsorption molded body, pulverizing the lithium adsorption molded body.

According to an embodiment of the present invention, a lithium adsorption molded body having an excellent lithium adsorption performance and mechanical strength may be manufactured.

MODE FOR INVENTION

Hereinafter, embodiments of the present invention will be described in detail so that those skilled in the art may easily practice the present invention. However, the present invention may be implemented in various different forms and is not limited to embodiments described herein.

In addition, throughout the present specification, unless explicitly described to the contrary, "comprising" any components will be understood to imply the inclusion of other components rather than the exclusion of any other components.

In the present specification, unless otherwise defined, the term "alkyl group" refers to "a saturated alkyl group" without any alkenyl group or alkynyl group, and "an unsaturated alkyl group" including at least one alkenyl group or alkynyl group. The "alkenyl group" refers to a substituent in which at least two carbon atoms are bound in at least one carbon-carbon double bond, and the term "alkyne group" refers to a substituent in which at least two carbon atoms are bound in at least one carbon-carbon triple bond. The alkyl group may be a branched, linear, or cyclic alkyl group.

For example, a C1 to C4 alkyl group may have 1 to 4 carbon atoms and may be selected from the group consisting of methyl, ethyl, propyl, iso-propyl, n-butyl, iso-butyl, sec-butyl, and t-butyl.

Typically, examples of an alkyl group include a methyl group, an ethyl group, a propyl group, an isopropyl group, a butyl group, an isobutyl group, a t-butyl group, a pentyl group, a hexyl group, an ethenyl group, a prophenyl group, a butenyl group, a cyclopropyl group, a cyclobutyl group, a cyclopentyl group, a cyclohexyl group, and the like.

In the present specification, unless otherwise defined, the term "copolymerization" refers to a block copolymerization, a random copolymerization, a graft copolymerization, or an alternating copolymerization, and the term "copolymer" refers to a block copolymer, a random copolymer, a graft copolymer, or an alternating copolymer.

Hereinafter, a lithium adsorption molded body according to an embodiment of the present invention will be described.

A lithium adsorption molded body according to an embodiment of the present invention includes a lithium adsorbent; and a copolymer including a repeating unit represented by the following Chemical Formula 1 and a repeating unit represented by the following Chemical Formula 2.

[Chemical Formula 1]

[Chemical Formula 2]

[Chemical Formula 1]

[Chemical Formula 2]

(In the Chemical Formulas 1 and 2, $R^1$ and $R^2$ are each independently hydrogen or a C1 to C10 alkyl group.)

Hereinafter, the respective components will be described in detail.

Any lithium adsorbent may be used with no particular limitation, as long as it is formed of a material adsorbing lithium dissolved in a lithium-containing solution and easily desorbing a recovered lithium. Specifically, the lithium adsorbent may include at least one selected from the group consisting of manganese, aluminum, iron, and magnesium. More specifically, the lithium adsorbent may include aluminum. Still more specifically, the lithium adsorbent may be represented by the following Chemical Formula 3.

$LiCl \cdot 2Al(OH)_3$     [Chemical Formula 3]

The lithium adsorption molded body may include 80 to 95 wt % of the lithium adsorbent. In a case where an amount of lithium adsorbent is too small, a lithium adsorption performance may not be appropriately exhibited. On the contrary, in a case where the amount of lithium adsorbent is too large, a mechanical strength may deteriorate. Accordingly, the lithium adsorption molded body may include an appropriate amount of the lithium adsorbent. More specifically, a content of the lithium adsorbent may be 85 to 90 wt %.

The lithium adsorbent is in a powder form, and a binder needs to be included so as to manufacture a lithium adsorption molded body having an appropriate form by using the lithium adsorbent in the powder form. In an embodiment of the present invention, a copolymer including a repeating unit represented by the following Chemical Formula 1 and a repeating unit represented by the following Chemical Formula 2 is used as a binder, such that it is possible to manufacture a lithium adsorption molded body having an excellent mechanical strength, ease of machining, and hydrophilicity. In this case, the term "ease of machining" means that kneading has flexibility before a solvent of a binder solution is completely removed after mixing powders so that the kneading may be easily extruded into a desired shape. The term "hydrophilicity" means that an aqueous lithium solution is in well contact with the lithium adsorbent and flows.

(In the Chemical Formulas 1 and 2, $R^1$ and $R^2$ are each independently hydrogen or a C1 to C10 alkyl group.)

In a case where a copolymer includes only a repeating unit represented by Chemical Formula 1, flexibility may deteriorate. In addition, in a case where a copolymer includes only a repeating unit represented by Chemical Formula 2, a mechanical strength may deteriorate. Further, the copolymer including only the repeating unit represented by Chemical Formula 1 may have a high strength, but is difficult to extrude the kneading of the molded body without a plasticizer, and has an insufficient hydrophilicity, such that the contact with the aqueous lithium solution is not easy and the adsorption performance may deteriorate. The copolymer including only the repeating unit represented by Chemical Formula 2 may easily extrude the kneading of the molded body, but may have a low strength after drying.

The copolymer may include 80 to 87 wt % of the repeating unit represented by the Chemical Formula 1 and 13 to 20 wt % of the repeating unit represented by the Chemical Formula 2. In a case where an amount of the repeating unit represented by Chemical Formula 1 is too small, the mechanical strength may deteriorate. On the contrary, in a case where an amount of the repeating unit represented by Chemical Formula 1 is too large, the flexibility may deteriorate. More specifically, the copolymer may include 82 to 87 wt % of the repeating unit represented by the Chemical Formula 1 and 13 to 18 wt % of the repeating unit represented by the Chemical Formula 2.

The lithium adsorption molded body according to an embodiment of the present invention uses the copolymer described above as a binder and adjusts a particle size of the lithium adsorbent, such that the lithium adsorption molded body has an excellent specific surface area and pore characteristics. As a result, the lithium adsorption performance may be improved. Specifically, it is possible to manufacture the lithium adsorption molded body having an excellent specific surface area and pore characteristics without sintering at a high temperature and using a pore forming agent.

Specifically, the specific surface area of the lithium adsorption molded body may be 15 to 40 m²/g. More specifically, the specific surface area of the lithium adsorption molded body may be 15 to 40 m²/g.

The lithium adsorption molded body may have 10 to 90 vol % of pores with 0.01 to 0.1 μm of a pore size and 10 to 90 vol % of the pores with 1 to 10 μm of the pore size with respect to the total pores in the lithium adsorption molded body. The lithium adsorption molded body described above has a bimodal pore structure that does not exist in the conventional lithium adsorption molded body, therefore the lithium adsorption performance is further improved.

The lithium adsorption molded body according to an embodiment of the present invention has an excellent lithium adsorption performance and mechanical strength. Specifically, the lithium adsorption performance may be 6 to 10 mg per 1 g of the lithium adsorbent. In addition, a compressive strength of the lithium adsorption molded body may be 5 to 30 MPa. As described above, since the mechanical strength is excellent, a height of a column may be 7 m to 40 m, which is high, when the molded body is applied to a lithium adsorption apparatus.

A method of manufacturing a lithium adsorption molded body according to an embodiment of the present invention includes: producing a mixture by mixing a lithium adsorbent, a copolymer including a repeating unit represented by the following Chemical Formula 1 and a repeating unit represented by the following Chemical Formula 2, and a solvent; and manufacturing a molded body by molding the mixture.

[Chemical Formula 1]

[Chemical Formula 2]

(In the Chemical Formulas 1 and 2, $R^1$ and $R^2$ are each independently hydrogen or a C1 to C10 alkyl group.)

Hereinafter, each process will be described in detail.

First, a mixture is produced by mixing a lithium adsorbent, a copolymer, and a solvent.

Since the lithium adsorbent and the copolymer are the same as those described in the lithium adsorption molded body, overlapped descriptions will be omitted.

Any method of manufacturing a lithium adsorbent may be used with no limitation. As an example, lithium adsorbent slurry is produced by adding an aqueous sodium hydroxide solution to a mixed solution of aluminum chloride and lithium chloride and reacting, and the lithium adsorbent slurry is washed and dried, such that the lithium adsorbent may be produced.

A lithium adsorbent having a specific particle size may be used. Specifically, 50 to 75 parts by weight of the lithium adsorbent having a particle size of less than 200 μm and 25 to 50 parts by weight of the lithium adsorbent having a particle size of 200 to 300 μm with respect to 100 parts by weight of the lithium adsorbent may be included in the lithium adsorbent. As described above, the lithium adsorbent having two kinds of particle sizes is used, such that the bimodal pore characteristic described above may be exhibited and the lithium adsorption performance may be further improved.

The solvent may uniformly disperse the lithium adsorbent and the copolymer and any solvent which may be easily removed in the molding and drying processes may be used without limitation. Specifically, the solvent may include at least one selected from the group consisting of an amide-based solvent, an ether-based solvent, a ketone-based solvent, and a sulfoxide-based solvent. More specifically, examples of the amide-based solvent may include N-methyl pyrrolidone (NMP), n-polyvinyl pyrrolidone, dimethyl acetamide (DMAc), and dimethyl formamide (DMF), examples of the ether-based solvent may include tetrahydrofuran (THF), examples of the ketone-based solvent may include acetone and methyl ethyl ketone (MEK), and examples of the sulfoxide-based solvent may include dimethyl sulfoxide (DMSO). More specifically, examples of the solvent may include methyl ethyl ketone having a boiling point of about 80° C.

An amount of solvent is not particularly limited, but the solvent may be included in an amount in which a viscosity of the mixture is adjusted in a range of 1000 to 1500 cps. In a case where the viscosity is too low, the molded body may not have an appropriate strength. On the contrary, in a case where the viscosity is too high, an efficient molding process may be not performed. In this case, the viscosity refers to a viscosity at a temperature of 25° C.

The producing of the mixture may be performed by a mixer and a kneader. The mixture may be mixed for 1 to 5 minutes by the mixer and may be mixed for 1 to 5 minutes by the kneader.

Returning to the description of the method of manufacturing a lithium adsorption molded body, the lithium adsorption molded body is manufactured by molding the produced mixture.

The molding process, for example, may be performed by a method of molding a lithium adsorbent in a pellet type cylindrical shape. The pellet type cylindrical lithium adsorbent, for example, may be produced by an extrusion process.

More specifically, the extrusion process is a method in which a fluid raw material kneading is filled into a cylinder, extruded through a mold having a certain shape, and continuously molded. In this case, a raw material kneading may be obtained and used by adding a binder to the lithium adsorbent produced by the method described above and producing kneading having a predetermined viscosity.

Next, the lithium adsorbent molded according to the shape of the mold may be formed to have a certain cross-sectional shape such as a rectangular shape, a circular shape, a T-shape, and the like.

In this case, the molded body is manufactured by an extruder and an extrusion speed may be 10 to 100 mm/min. In a case where the extrusion speed is too fast or too slow, the molded body may not be appropriately molded.

Meanwhile, a screw-type extruder and a piston-type extruder may be used as the extruder used in the extruding.

The screw-type extruder may push a high-viscosity kneading through a force of a screw. The piston-type extruder has a force weaker than that of the screw-type extruder, but may extrude the kneading into a complicated shape such as a honeycomb shape.

The physical properties and characteristics of the manufactured molded body was described in the lithium adsorption molded body described above, overlapped descriptions will be omitted.

The method may further include, after the manufacturing of the lithium adsorption molded body, drying the lithium adsorption molded body. By further including the drying, a solvent remaining in the lithium adsorption molded body may be completely removed. The lithium adsorption molded body may be dried at a temperature of 40 to 60° C. for 1 to 10 hours.

The method may further include, after the manufacturing of the lithium adsorption molded body, pulverizing the lithium adsorption molded body. The lithium adsorption molded body is pulverized at a length of 1 to 5 mm and may be used when forming a column for recovering lithium.

Hereinafter, Examples and Experimental Example of the present invention will be described. However, Examples are only preferred embodiments of the present invention, and the present invention is not limited to Examples.

Production Example—Production of Lithium Adsorbent

Aluminum chloride and lithium chloride were charged into a reactor filled with distilled water at a molar ratio of 2:1 and dissolved.

6 moles of aqueous sodium hydroxide solution was added to the dissolved mixed solution of aluminum chloride and lithium chloride at 45.6 ml/min for 1 hour to perform a reaction as the following Reaction Formula 1.

$2AlCl_3 + LiCl + 6NaOH \rightarrow$
$LiCl \cdot 2Al(OH)_3 \cdot nH_2O + 6NaCl$ [Reaction Formula 1]

The reaction was performed at 80° C. and 500 rpm for about 2 hours to obtain lithium adsorbent slurry. The obtained lithium adsorbent slurry was solid-liquid separated by a general filtration under reduced pressure to obtain a cake.

Then, in order to remove sodium chloride (NaCl) remained in the obtained cake, the sodium chloride in the cake was washed by using wash water having a weight at least four times the weight of the lithium adsorbent slurry. The washed cake was dried using a drier at 40° C. to 50° C. for 24 hours or more to produce a lithium adsorbent powder.

Example 1

The lithium adsorbent powder produced in Production Example was classified into 750 g of powder having a size of less than 200 μm and 250 g of powder having a size of 200 to 300 μm and then each of the classified powders was put into a mixer. 150 g of a copolymer including a repeating unit represented by the following Chemical Formula 4 and a repeating unit represented by the following Chemical Formula 5 as a binder, and 530 g of MEK as a solvent were added to the mixer, and mixed for 2 minutes. About 87 wt % of the repeating unit represented by the following Chemical Formula 4 and about 13 wt % of the repeating unit represented by the following Chemical Formula 5 were included in the copolymer.

[Chemical Formula 4]

[Chemical Formula 5]

In this case, a viscosity of kneading was a torque value of 5 Nm.

The kneading was extruded by an extruder to produce a pellet-shaped molded body with a diameter of 0.5 mm, and thereafter the molded body was dried at 45° C. for 8 hours.

Figure 1:
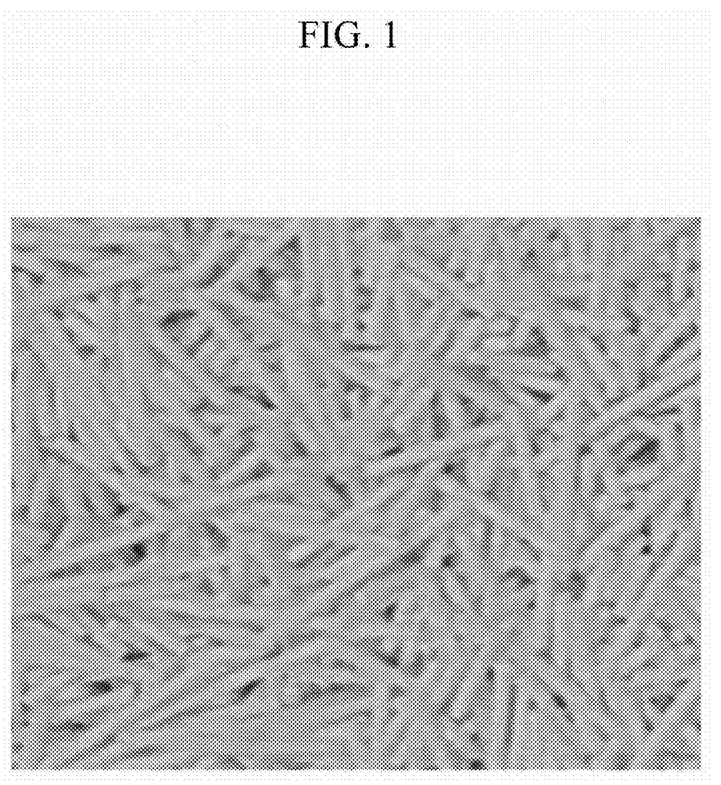
FIG. 1 is a photograph of a lithium adsorption molded body manufactured in Example 1.
Figure 2:
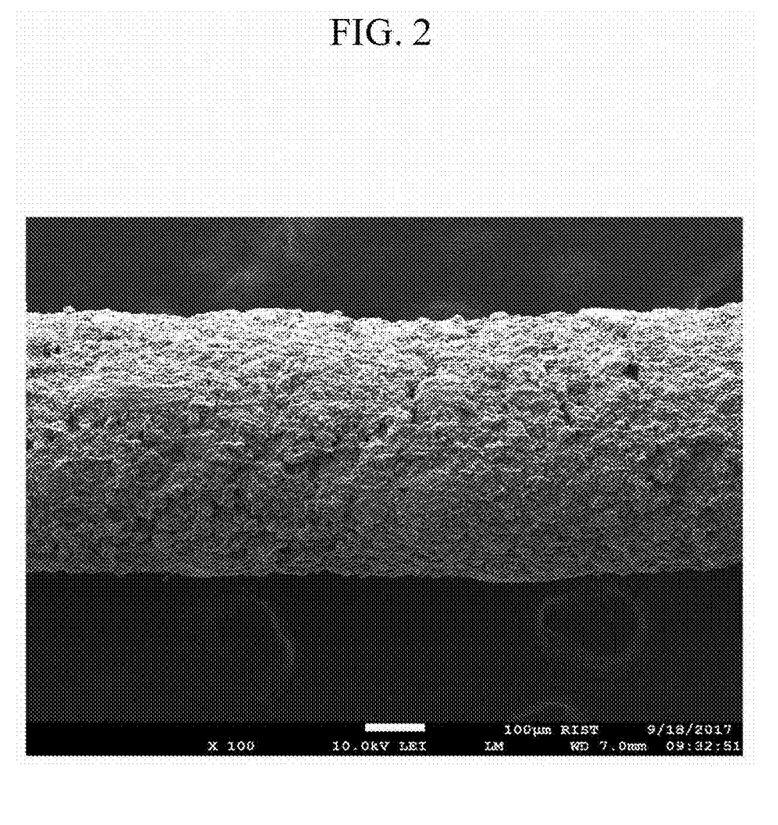
FIG. 2 is a photograph obtained by observing the lithium adsorption molded body manufactured in Example 1 with a scanning electron microscope (SEM).
Figure 3:
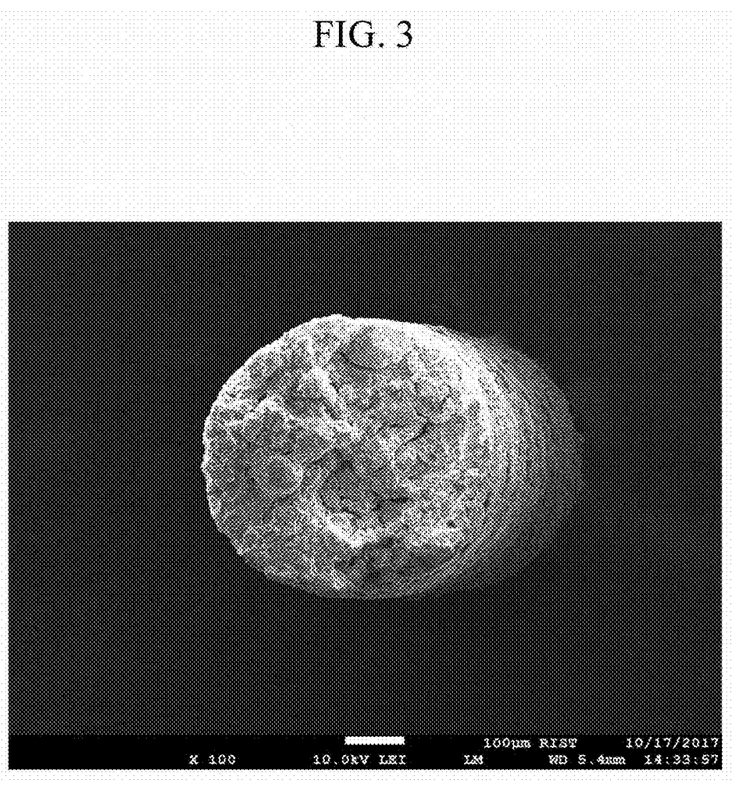
FIG. 3 is a photograph obtained by observing the lithium adsorption molded body manufactured in Example 1 with the SEM.
Figure 4:
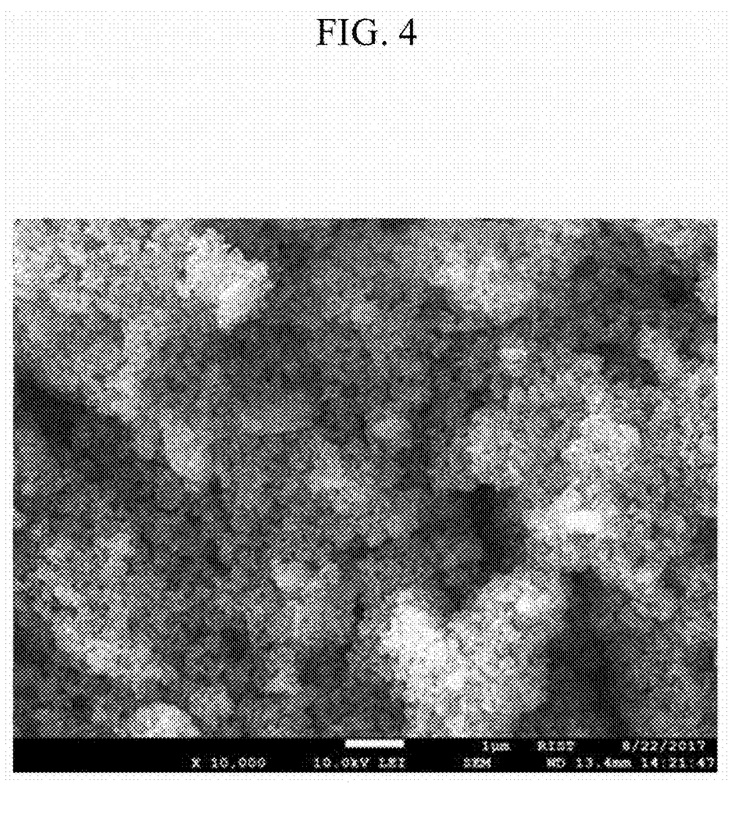
FIG. 4 is a photograph obtained by observing the lithium adsorption molded body manufactured in Example 1 with the SEM.
Figure 5:
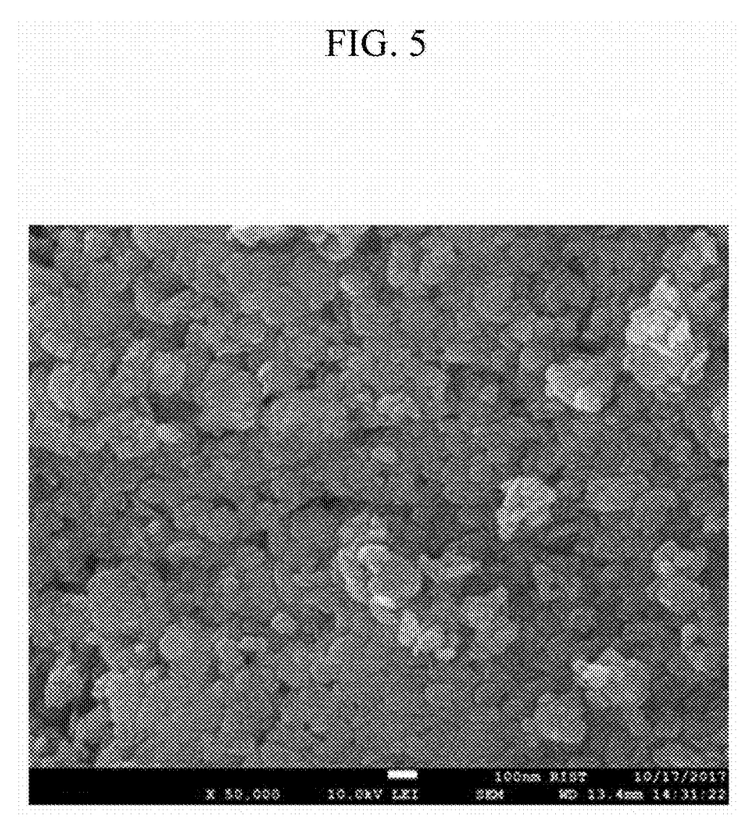
FIG. 5 is a photograph obtained by observing the lithium adsorption molded body manufactured in Example 1 with the SEM.

FIG. 1 illustrates a photograph of the manufactured lithium adsorption molded body, and FIGS. 2 to 5 illustrate the results of observing the lithium adsorption molded body with a scanning electron microscope (SEM). In particular, FIGS. 4 and 5 illustrate the results of observing the lithium adsorption molded body at 10,000 and 50,000 magnification, respectively. A plurality of pores with a size of several micrometers are confirmed in FIG. 4 and a plurality of pores with a size of 0.01 to 0.1 μm are confirmed in FIG. 5.

Figure 6:
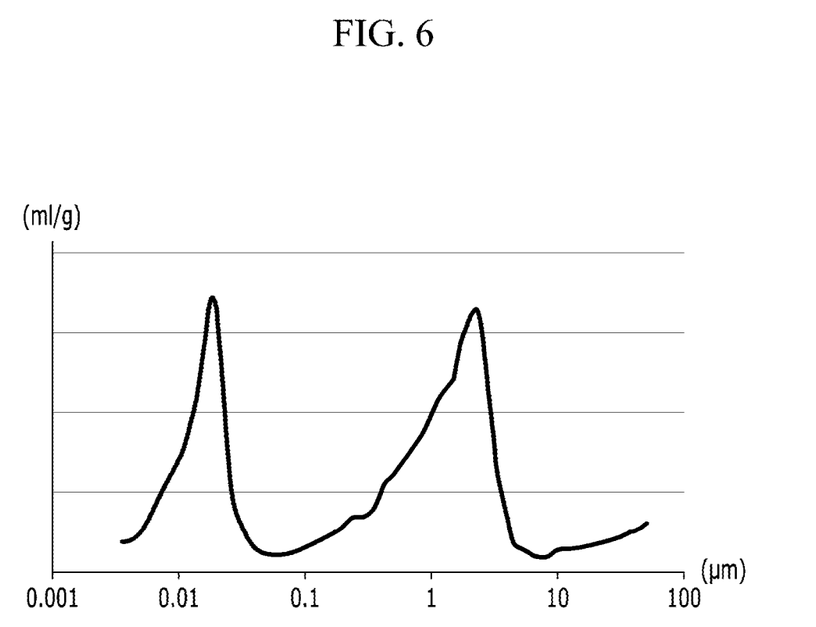
FIG. 6 is a graph showing the results of analyzing pore characteristics of the lithium adsorption molded body manufactured in Example 1.

FIG. 6 illustrates the results of analyzing pore characteristics of the manufactured lithium adsorption molded body. As illustrated in FIG. 6, it can be confirmed that a plurality of pores with a size of 0.01 to 0.1 μm and a plurality of pores with a size 1 to 10 μm are formed, such that the lithium adsorption molded body has a bimodal pore structure. An X-axis represents a pore size and a Y-axis represents a pore volume per unit gram (mL/g).

Example 2

A lithium adsorption molded body was produced in the same manner as in Example 1, except that a copolymer including about 95 wt % of a repeating unit represented by Chemical Formula 4 and about 5 wt % of a repeating unit represented by Chemical Formula 5.

Experimental Example

The lithium adsorption molded bodies manufactured in Examples 1 and 2 each were filled in a glass tube having a diameter of 2.5 cm and a length of 50 cm to form a column, lithium-containing solutions having a composition as in Table 1 were down-flowed thereto, and the performance of the adsorbent was evaluated by analyzing a sample solution discharged. The evaluation results are summarized in Table 2.

In addition, the compressive strength of the manufactured lithium adsorption molded body was measured and the results are summarized in Table 2.

TABLE 1

| Classification | Li | Ca | Mg | B | S |
|---|---|---|---|---|---|
| Lithium-containing solution (g/L) | 0.469 | 0.960 | 0.578 | 0.236 | 2.90 |

TABLE 2

| Classification | Adsorption performance(mg/g) | Compressive strength (MPa) |
|---|---|---|
| Example 1 | 6.8 | 26 |
| Example 2 | 4.0 | 29 |

Referring to Table 2, it may be confirmed that the compressive strength of the lithium adsorption molded body manufactured in Example 1 is similar to that of the lithium adsorption molded body manufactured in Example 2, and the lithium adsorption performance of the lithium adsorption molded body manufactured in Example 1 is improved by about 1.7 times as compared with the lithium adsorption molded body manufactured in Example 2.

The present invention is not limited to the embodiments and may be implemented in various different forms. It will be understood to those skilled in the art to which the present invention pertains that the present invention may be implemented in different specific forms without changing the technical ideals or essential features. Therefore, it is to be understood that the embodiments described hereinabove are illustrative rather than being restrictive in all aspects.

The invention claimed is:

1. A lithium adsorption molded body comprising:
a lithium adsorbent; and
a copolymer including a repeating unit represented by the following Chemical Formula 1 and a repeating unit represented by the following Chemical Formula 2,

[Chemical Formula 1]

[Chemical Formula 2]

(in the Chemical Formulas 1 and 2, $R^1$ and $R^2$ are each independently hydrogen or a C1 to C10 alkyl group).

2. The lithium adsorption molded body of claim 1, wherein:
the lithium adsorbent includes at least one selected from the group consisting of manganese, aluminum, iron, and magnesium.

3. The lithium adsorption molded body of claim 1, wherein:
the lithium adsorbent includes aluminum.

4. The lithium adsorption molded body of claim 1, wherein:
the copolymer includes 80 to 87 wt % of the repeating unit represented by the Chemical Formula 1 and 13 to 20 wt % of the repeating unit represented by the Chemical Formula 2.

5. The lithium adsorption molded body of claim 1, wherein:
the lithium adsorption molded body includes 80 to 95 wt % of the lithium adsorbent and 5 to 20 wt % of the copolymer.

6. The lithium adsorption molded body of claim 1, wherein:
a specific surface area of the lithium adsorption molded body is 15 to 40 m$^2$/g.

7. The lithium adsorption molded body of claim 1, wherein:
the lithium adsorption molded body has 10 to 90 vol % of pores with 0.01 to 0.1 μm of a pore size and 10 to 90 vol % of the pores with 1 to 10 μm of the pore size with respect to the total pores in the lithium adsorption molded body.

8. The lithium adsorption molded body of claim 1, wherein:
a compressive strength of the lithium adsorption molded body is 5 to 30 MPa.

* * * * *